United States Patent
Asakura et al.

(10) Patent No.: US 10,246,122 B2
(45) Date of Patent: Apr. 2, 2019

(54) BALL SCREW MECHANISM AND STEERING SYSTEM

(71) Applicant: JTEKT CORPORATION, Osaka-shi, Osaka (JP)

(72) Inventors: Toshihiro Asakura, Chiryu (JP); Takuya Nakayama, Okazaki (JP); Keisuke Ogawa, Toyota (JP)

(73) Assignee: JTEKT CORPORATION, Osaka-shi (JP)

( * ) Notice: Subject to any disclaimer, the term of this patent is extended or adjusted under 35 U.S.C. 154(b) by 13 days.

(21) Appl. No.: 15/596,466

(22) Filed: May 16, 2017

(65) Prior Publication Data
US 2017/0334479 A1     Nov. 23, 2017

(30) Foreign Application Priority Data

May 23, 2016 (JP) ................................. 2016-102720

(51) Int. Cl.
*B62D 3/08* (2006.01)
*B62D 5/04* (2006.01)
*F16H 25/22* (2006.01)
*F16H 25/24* (2006.01)

(52) U.S. Cl.
CPC ......... *B62D 5/0448* (2013.01); *B62D 5/0424* (2013.01); *F16H 25/2233* (2013.01); *F16H 25/24* (2013.01)

(58) Field of Classification Search
CPC .. B62D 5/0448; B62D 5/0424; B62D 5/0445; B62D 3/08; B62D 5/04; F16H 25/2233; F16H 25/2238; F16H 25/24

USPC ...... 180/444; 74/424.87, 424.88, 89.4, 89.41
See application file for complete search history.

(56) References Cited

U.S. PATENT DOCUMENTS

| 8,950,544 | B2 * | 2/2015 | Yoshioka | B62D 5/0448 180/444 |
| 2009/0255752 | A1 | 10/2009 | Asakura et al. | |
| 2012/0192663 | A1 | 8/2012 | Babinski | |

(Continued)

FOREIGN PATENT DOCUMENTS

| EP | 2 610 134 A2 | 7/2013 |
| FR | 2 306 381 A1 | 10/1976 |

(Continued)

OTHER PUBLICATIONS

Nov. 14, 2017 Search Report issued in European Patent Application No. 17171498.3.

*Primary Examiner* — Anne Marie M Boehler
(74) *Attorney, Agent, or Firm* — Oliff PLC (57) ABSTRACT

A ball screw mechanism that allows a reduction in contact and friction between a retainer and a nut is provided. In a ball screw mechanism, a nut is threadedly engaged with a screw groove of a rack shaft through balls retained in a retainer groove of a retainer, and an axial force is applied to the rack shaft in accordance with rotation of the nut. The nut includes a uniform diameter portion having a uniform inside diameter and enlarged diameter portions each having an inside diameter larger than that of the uniform diameter portion. The enlarged diameter portions are provided at opposite axial ends of a region on an inner circumferential surface of the nut. The region faces the retainer groove and retainer ends adjoining to opposite axial ends of the retainer groove.

9 Claims, 6 Drawing Sheets

(56) References Cited

U.S. PATENT DOCUMENTS

2014/0353068 A1* 12/2014 Yamamoto ........... B62D 5/0412
                                                          180/444
2015/0274200 A1   10/2015 Nakamura et al.
2015/0284020 A1*  10/2015 Asakura ............. F16H 25/2204
                                                          180/444
2016/0207560 A1*   7/2016 Muto ................... B62D 5/0403

FOREIGN PATENT DOCUMENTS

| JP | H05-8104 U | | 2/1993 | |
|----|------------|---|--------|---|
| JP | 2002-039316 | * | 2/2002 | ............. F16H 25/24 |
| JP | 5120040 B2 | | 1/2013 | |
| JP | 2015-186949 A | | 10/2015 | |
| WO | WO 2015/029672 | * | 3/2015 | ........... B62D 5/0403 |

* cited by examiner

BALL SCREW MECHANISM AND STEERING SYSTEM

INCORPORATION BY REFERENCE

The disclosure of Japanese Patent Application No. 2016-102720 filed on May 23, 2016 including the specification, drawings and abstract, is incorporated herein by reference in its entirety.

BACKGROUND OF THE INVENTION

1. Field of the Invention

The invention relates to a ball screw mechanism and a steering system.

2. Description of Related Art

Some ball screw mechanisms include a screw shaft with a helical screw groove on the outer circumferential surface and a nut with a helical screw groove corresponding to the screw groove of the screw shaft. When the nut is threadedly engaged with the screw groove of the screw shaft through balls, an axial force is applied to the screw shaft in accordance with rotation of the nut. This type of ball screw mechanism is used in steering systems that steer steered wheels by converting rotary motion of a motor into linear motion of a steered shaft, such as a rack shaft, as disclosed in, for example, Japanese Patent Application Publication No. 2015-186949 (JP 2015-186949 A) and Japanese Patent No. 5120040 (JP 5120040).

A nut used in the ball screw mechanism disclosed in JP 2015-186949 A has a tapered portion at both axial ends to avoid contact with a tool used to provide a screw groove. In the ball screw mechanism disclosed in JP 5120040, a retainer is provided between a rack shaft and a nut to allow adjacent balls to avoid contact with each other. The retainer has retainer grooves and retains the balls in the retainer grooves to allow radially outward movement of the balls and to restrict radially inward movement of the balls.

For example, to allow for tolerances of the retainer, the balls, and the screw grooves of the screw shaft and the nut, the dimensions of the retainer disclosed in JP 5120040 may be set such that there is some clearance between the retainer groove and the balls. This allows the retainer to move radially to some extent. Therefore, the retainer may be inclined with respect to the nut, and at worst, the axial ends of the retainer may come into contact with the axial ends of the nut. Such situation may occur also when a retainer is provided in a ball screw mechanism, such as disclosed in JP 2015-186949 A, that uses a nut having a tapered portion to avoid contact with a tool used to provide a screw groove.

SUMMARY OF THE INVENTION

A purpose of the invention is to provide a ball screw mechanism and a steering system that allow a reduction in contact and friction between a retainer and a nut.

An aspect of the invention provides a ball screw mechanism including: a screw shaft having an outer circumferential surface provided with a helical screw groove; a cylindrical nut having an inner circumferential surface provided with a helical screw groove corresponding to the screw groove of the screw shaft; multiple balls; and a cylindrical retainer provided between the screw shaft and the nut. The retainer has a retainer groove that retains the balls to allow the balls to avoid contact with each other. The nut is threadedly engaged with the screw groove of the screw shaft through the balls. An axial force is applied to the screw shaft in accordance with rotation of the nut. The nut includes a uniform diameter portion and an enlarged diameter portion. The uniform diameter portion has a uniform inside diameter. The enlarged diameter portion has an inside diameter larger than the inside diameter of the uniform diameter portion. The enlarged diameter portion is provided at at least one of opposite axial ends of a region on the inner circumferential surface of the nut. The region faces the retainer groove and retainer ends adjoining to opposite axial ends of the retainer groove.

The retainer may be inclined with respect to the nut when dimensions are set such that there is some clearance between the retainer groove and the balls to allow for tolerances of the retainer, the balls, the screw grooves of the screw shaft and the nut. If such situation occurs, the axial ends of the retainer may approach and come into contact with the axial ends of the nut in a radial direction.

According to this aspect, when the axial ends of the retainer approach the axial ends of the nut, the axial end of the nut provided with the enlarged diameter portion is less likely to come into contact with the axial end of the retainer. This allows a reduction in contact and friction between the retainer and the nut, thus making it possible to reduce a friction torque of the nut.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Below, a ball screw mechanism and a steering system according to an embodiment of the invention is described. The steering system according to the embodiment is an electric power steering system (hereinafter referred to as "EPS") that assists steering operation of a user by transmitting rotary motion of a motor to the ball screw mechanism through a belt reduction mechanism so as to convert the rotary motion of the motor into linear motion of a rack shaft.

Figure 1:
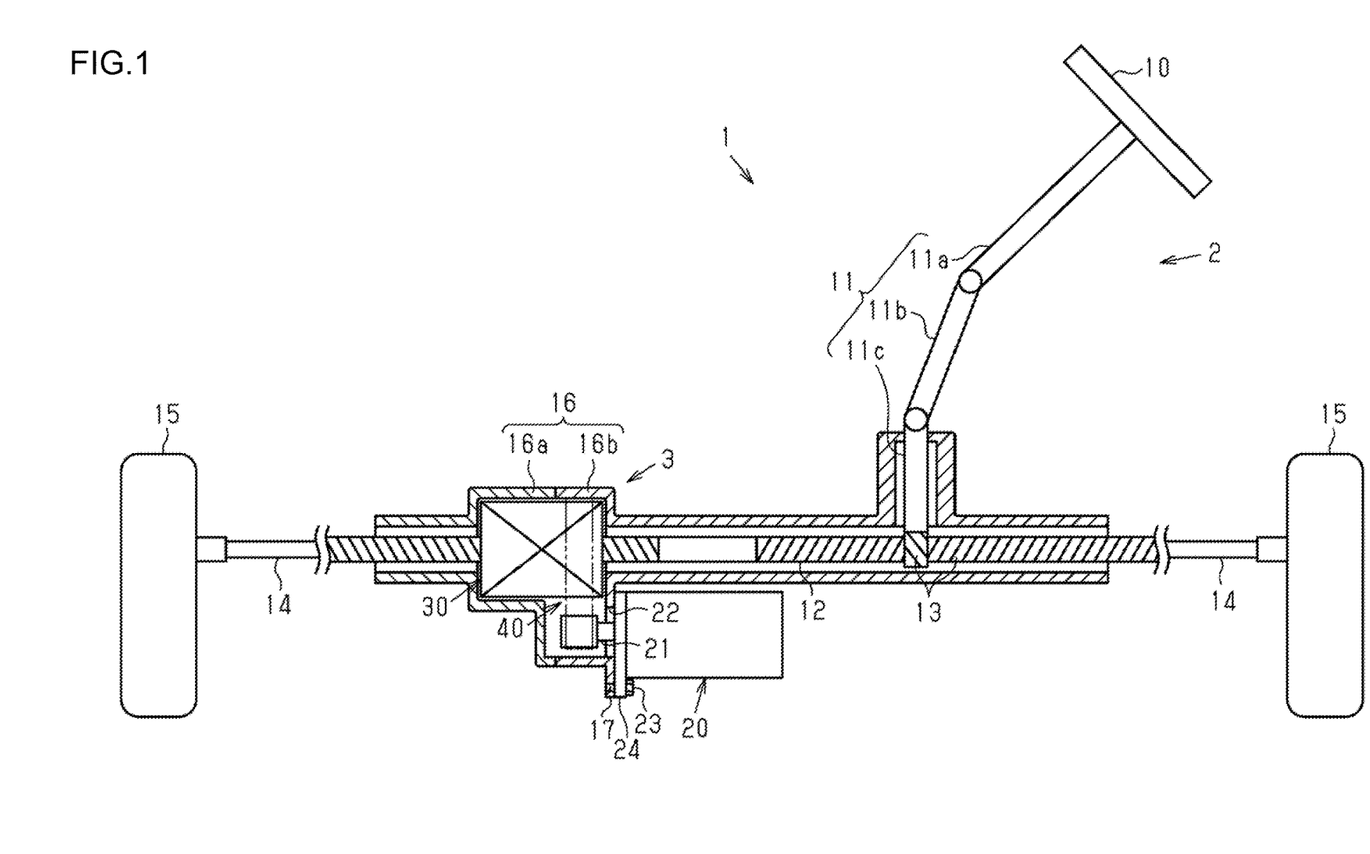
FIG. 1 is a schematic diagram illustrating the structure of an electric power steering system.

As shown in FIG. 1, an EPS 1 includes a steering mechanism 2 and an assist mechanism 3. The steering mechanism 2 steers steered wheels 15 in accordance with a steering operation that a user performs to control a steering wheel 10. The assist mechanism 3 assists the steering operation performed by a user.

The steering mechanism 2 includes the steering wheel 10 and a steering shaft 11 that turns along with the steering wheel 10. The steering shaft 11 includes a column shaft 11a coupled to the steering wheel 10, an intermediate shaft 11b coupled to the bottom end of the column shaft 11a, and a pinion shaft 11c coupled to the bottom end of the intermediate shaft 11b. The bottom end of the pinion shaft 11c is coupled through a rack and pinion mechanism 13 to a rack shaft 12 as a steered shaft. Thus, rotary motion of the steering shaft 11 is converted into reciprocating linear motion of the rack shaft 12 in an axial direction (right-left direction in FIG. 1) through the rack and pinion mechanism 13 that includes the pinion shaft 11c and the rack shaft 12. The reciprocating linear motion is transmitted to the right and left steered wheels 15 through tie rods 14 coupled to both ends of the rack shaft 12, thus changing a steered angle of the steered wheels 15. According to the embodiment, the rack shaft 12 is an example of a screw shaft.

In the description below, an axial direction refers to a direction along the axial length of the rack shaft 12, and a radial direction refers to a direction perpendicular to the axial direction. The assist mechanism 3 is provided in the vicinity of the rack shaft 12. The assist mechanism 3 includes a motor 20 as a source for generating an assisting force, a ball screw mechanism 30 integrally attached to the periphery of the rack shaft 12, and a belt-type reduction mechanism (hereinafter referred to as the "reduction mechanism") 40 for transmitting the rotational force of a rotating shaft 21 of the motor 20 to the ball screw mechanism 30. The assist mechanism 3 converts, through the reduction mechanism 40 and the ball screw mechanism 30, the rotational force of the rotating shaft 21 of the motor 20 into a force that causes the rack shaft 12 to reciprocate linearly in the axial direction. This axial force applied to the rack shaft 12 acts as the assisting force for assisting the steering operation performed by a user.

The ball screw mechanism 30, the reduction mechanism 40, the pinion shaft 11c, and the rack shaft 12 are covered with a housing 16 that extends along the axial direction of the rack shaft 12. The housing 16 is divided in the axial direction at a position near the reduction mechanism 40 into a first housing 16a and a second housing 16b. The first housing 16a and the second housing 16b are coupled to form the housing 16. Each of the first and second housings 16a and 16b projects in a direction (i.e., in a downward direction in FIG. 1) intersecting with a direction that the rack shaft 12 extends in. The outer wall (the right side wall in FIG. 1) of the second housing 16b has a through hole 22. The rotating shaft 21 of the motor 20 extends into the second housing 16b through the through hole 22. A flange portion 17 of the second housing 16b and a flange portion 24 of the motor 20 are coupled together by a bolt 23 so that the motor 20 is fixed to the second housing 16b. The rotating shaft 21 is parallel to the rack shaft 12.

Figure 2:
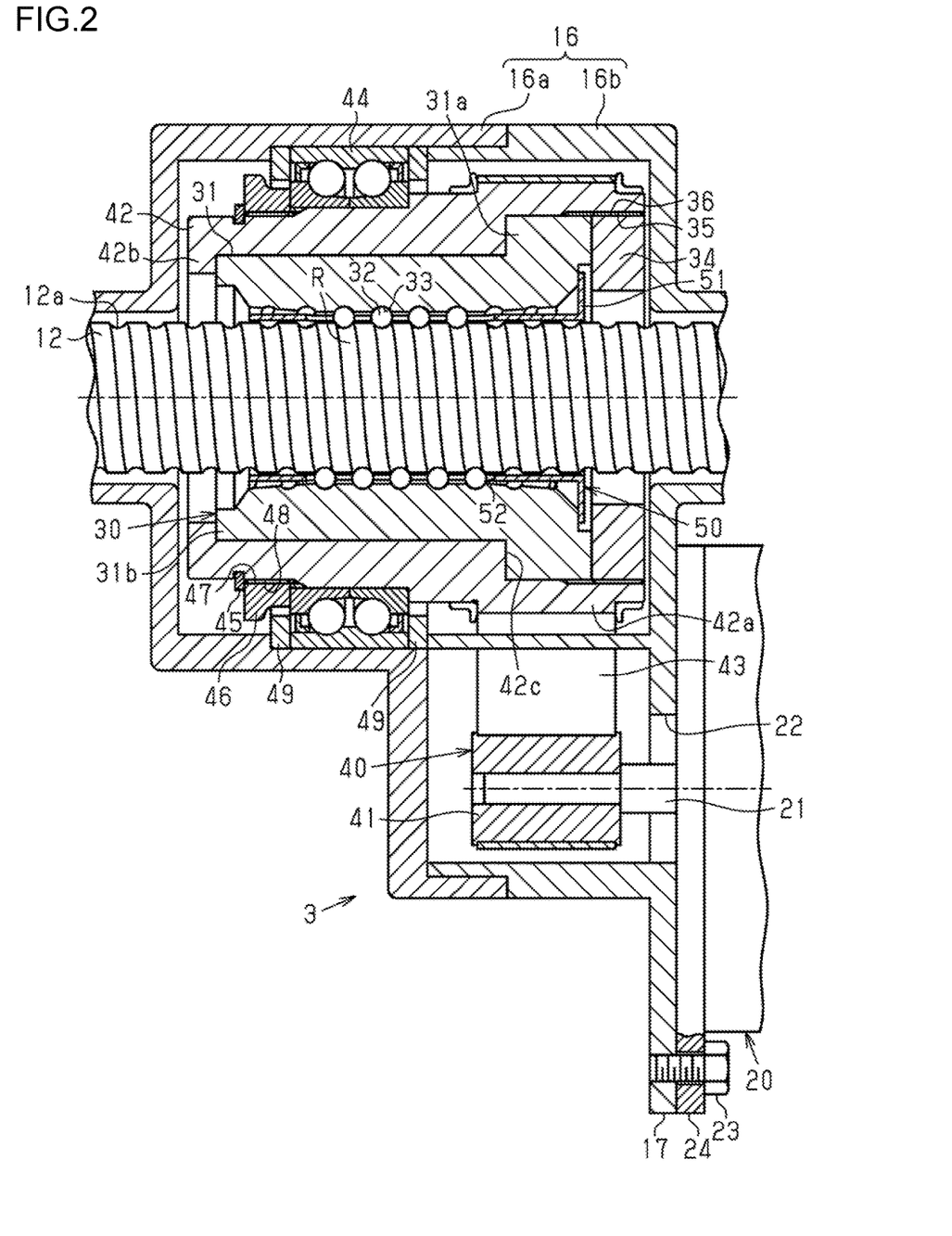
FIG. 2 is a schematic diagram illustrating the structure of an assist mechanism of the electric power steering system.

Next, the assist mechanism 3 is described in detail. As shown in FIG. 2, the ball screw mechanism 30 includes a cylindrical nut 31 that is threadedly engaged with the rack shaft 12 through multiple balls 32. A helical screw groove 12a is provided on the outer circumferential surface of the rack shaft 12. A helical screw groove 33 corresponding to the screw groove 12a of the rack shaft 12 is provided on the inner circumferential surface of the nut 31. A helical space defined by the screw groove 33 of the nut 31 and the screw groove 12a of the rack shaft 12 serves as a rolling path R where the balls 32 roll. Although not shown in the drawings, the nut 31 has a circulation path that connects two openings in the rolling path R. This structure allows the balls 32 to circulate endlessly in the rolling path R by way of the circulation path in the nut 31. The rolling path R is coated with a lubricant, such as grease, to reduce frictional resistance when the balls 32 roll. The rack shaft 12 and the nut 31 are each made of an iron alloy, such as a steel, and the balls 32 are made of a steel, such as a bearing steel.

The reduction mechanism 40 includes a driving pulley 41 integrally attached to the rotating shaft 21 of the motor 20, a driven pulley 42 integrally attached to the outer periphery of the nut 31, and a belt 43 wrapped between the driving pulley 41 and the driven pulley 42. The belt 43 is a toothed rubber belt having a core wire. The driving pulley 41 and the driven pulley 42 are each a toothed pulley.

The driven pulley 42 is supported by a cylindrical bearing 44 and is rotatable relative to the inner surface of the first housing 16a. For example, the bearing 44 is a double-row angular contact ball bearing (a type of common, general-purpose bearing). The bearing 44 has load capacity that allows a continuous use of the bearing 44 even after the bearing 44 is subjected to the load (i.e., load rating) that the bearing 44 is expected to withstand a prescribed number of times without damage.

On the outer circumferential surface of the driven pulley 42, a stopper ring 45, a locking nut 46, and the bearing 44 are arranged in this order in the axial direction from the side opposite to the rack and pinion mechanism 13. On the outer circumferential surface of the driven pulley 42, the stopper ring 45 is fitted into a flange portion located at an end of the driven pulley 42 that is opposite to the rack and pinion mechanism 13. A screw groove 48 threadedly engaged with a screw groove 47 on the outer circumferential surface of the driven pulley 42 is provided on the inner circumferential surface of the locking nut 46. The stopper ring 45 stops the locking nut 46 from coming off the outer circumferential surface of the driven pulley 42 because the stopper ring 45 is fitted into the flange portion located at the end of the driven pulley 42 that is opposite to the rack and pinion mechanism 13. An inner ring of the bearing 44 is fixed to the outer circumferential surface of the driven pulley 42 by being sandwiched between the locking nut 46 and a flange portion 42a of the driven pulley 42 that projects radially outward. An outer ring of the bearing 44 is fixed by being sandwiched between the first housing 16a and the second housing 16b through fixation members 49 that are provided on both axial sides of the outer ring.

On the inner circumferential surface of the driven pulley 42, the nut 31 and a locking screw 34 are arranged in this order in the axial direction from the side opposite to the rack and pinion mechanism 13. A screw groove 36 threadedly engaged with a screw groove 35 on the inner circumferential surface of the driven pulley 42 is provided on the outer circumferential surface of the locking screw 34. The nut 31 is fixed to the inner circumferential surface of the driven pulley 42 by being sandwiched between the locking screw 34 and a flange portion 42b of the driven pulley 42 that projects radially inward. The nut 31 has a flanged end 31a projecting radially outward. On the inner circumferential surface of the driven pulley 42, the flanged end 31a abuts against a step portion 42c that has a wall toward the rack and pinion mechanism 13. The nut 31 has a shafted end 31b opposite to the flanged end 31a. On the inner circumferential surface of the driven pulley 42, the shafted end 31b abuts against the flange portion 42b. As such, the nut 31 is fixed to the driven pulley 42 in the axial direction, in the radial direction, and in a rotation direction about its axis.

Thus, when the rotating shaft 21 of the motor 20 rotates, the driving pulley 41 rotates along with the rotating shaft 21.

The rotation of the driving pulley 41 is transmitted to the driven pulley 42 through the belt 43. Accordingly, the driven pulley 42 rotates along with the nut 31. Since the nut 31 rotates relative to the rack shaft 12, the balls 32 interposed between the nut 31 and the rack shaft 12 are loaded by both the nut 31 and the rack shaft 12, thus circulating endlessly in the rolling path R. The rolling of the balls 32 in the rolling path R converts a torque applied to the nut 31 into the axial force applied to the rack shaft 12. Accordingly, the rack shaft 12 moves in the axial direction relative to the nut 31. The axial force applied to the rack shaft 12 acts as an assisting force and assists a steering operation performed by a user. A retainer 50 is provided between the outer circumferential surface of the rack shaft 12 and the inner circumferential surface of the nut 31. The retainer 50 retains the balls 32 to allow the balls 32 to avoid contact with each other.

Figure 3:
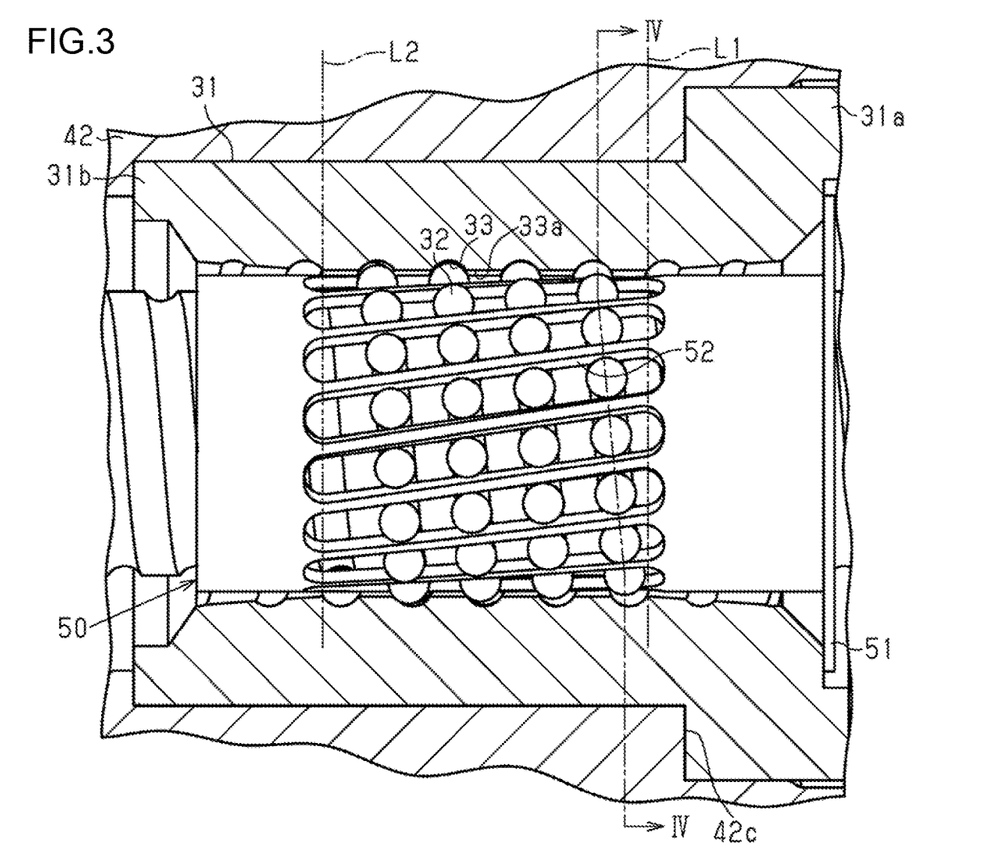
FIG. 3 is a schematic diagram illustrating the structure of a retainer of the assist mechanism.

Next, the retainer 50 is described in detail. As illustrated in FIG. 2 and FIG. 3, the retainer 50 is made of resin and has a cylindrical shape extending along the axial direction. One end of the retainer 50 in the axial direction is provided with a rib portion 51 that projects radially outward. The rib portion 51 extends continuously over the entire circumference of the retainer 50. The length of the retainer 50 in the axial direction is set such that the end provided with the rib portion 51 does not project beyond the flanged end 31a of the nut 31 in the axial direction and such that the other end opposite to the end provided with the rib portion 51 does not project beyond the shafted end 31b of the nut 31 in the axial direction. The rib portion 51 is located between the flanged end 31a of the nut 31 and the locking screw 34 to restrict the movement of the retainer 50 in the axial direction.

The retainer 50 has multiple (16 in the embodiment) retainer grooves 52 that go through the retainer 50 in the radial direction and that are spaced at equal intervals in the circumferential direction of the retainer 50. The retainer grooves 52 extend along the axial direction of the retainer 50 and are inclined at a predetermined angle with respect to the axial direction of the retainer 50 in such a manner that the retainer grooves 52 intersect perpendicularly with a direction that the screw groove 33 of the nut 31 (i.e., the rolling path R) extends in.

Figure 4A:
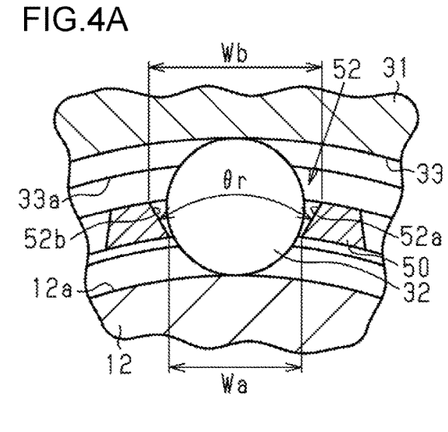
FIG. 4A is a cross-sectional view of part of the retainer in FIG. 3 taken along line IV-IV in FIG. 3.
Figure 4B:
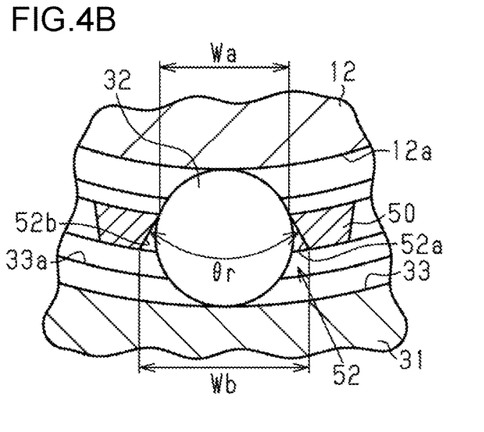
FIG. 4B is a cross-sectional view of part of the retainer in FIG. 3 taken along line IV-IV in FIG. 3.

The structure of the retainer grooves 52 is described in further detail below. As illustrated in FIGS. 4A and 4B, each of the retainer grooves 52 has a pair of tapered surfaces 52a and 52b that cause the retainer groove 52 to be tapered such that the width of the retainer groove 52 in the circumferential direction of the retainer 50 increases radially from the inner side to the outer side when viewed from the axial direction of the retainer 50. The pair of tapered surfaces 52a and 52b define the outline of the retainer groove 52 and are connected together at both axial ends of the retainer groove 52. A tapered angle $\theta r$ formed by the pair of tapered surfaces 52a and 52b of the retainer groove 52 has a magnitude that causes a radially innermost width Wa of the retainer groove 52 to be smaller than the diameter of the balls 32 and that causes a radially outermost width Wb of the retainer groove 52 to be larger than the diameter of the balls 32.

As illustrated in FIG. 3 and FIGS. 4A and 4B, a predetermined number of balls 32 are located in each of the retainer grooves 52 and are spaced at equal intervals in the axial direction of the retainer 50. The equal interval corresponds to a so-called pitch, i.e., the distance between adjacent turns of the screw groove 33 on the inner circumferential surface of the nut 31. Further, the balls 32 are spaced at equal intervals (i.e., intervals that the retainer grooves 52 are spaced at) in the circumferential direction of the retainer 50. Thus, when the balls 32 are located in the retainer grooves 52, the balls 32 are retained such that each of the balls 32 avoids contact with any other balls 32. In this case, the balls 32 are allowed to move in the radially outward direction of the retainer 50 and are restricted to move in the radially inward direction of the retainer 50.

To allow for tolerances of the retainer 50, the balls 32, the screw groove 12a of the rack shaft 12, and the screw groove 33 of the nut 31, the tapered angle $\theta r$ and the groove widths Wa and Wb are set such that there is some clearance between the retainer groove 52 and the balls 32 when the nut 31 is threadedly engaged with the screw groove 12a of the rack shaft 12 through the balls 32. In this case, the retainer 50 is allowed to move to some extent in the radial direction, i.e., in a direction toward or away from the nut 31.

For example, when the assist mechanism 3 is mounted in such a manner that gravity acts downward in a vertical direction in FIG. 3, the retainer 50 moves toward the balls 32 in the lower part of the drawing due to the weight of the retainer 50 as illustrated in FIG. 4B, so that the balls 32 abut against the pair of tapered surfaces 52a and 52b of the retainer groove 52. In this case, there is no clearance between the retainer 50 and the balls 32 in the lower part of the drawing.

In contrast, as illustrated in FIG. 4A, since the retainer 50 moves toward the balls 32 in the lower part of the drawing due to the weight of the retainer 50, the pair of tapered surfaces 52a and 52b of the retainer groove 52 are spaced radially inward from the balls 32 in the upper part of the drawing accordingly. In this case, there is some clearance between the retainer 50 and the balls 32 in the upper part of the drawing.

The remaining part other than those illustrated in FIGS. 4A and 4B includes both a situation where the balls 32 abut against the pair of tapered surfaces 52a and 52b of the retainer groove 52 and a situation where the pair of tapered surfaces 52a and 52b of the retainer groove 52 are spaced radially inward from the balls 32.

Thus, when the balls 32 are retained in the retainer grooves 52, the retainer 50 is radially supported by the balls 32, at least, in the lower part of the drawing while having some clearance with the balls 32, at least, in the upper part of the drawing. Further, when the components of the EPS 1 including the rack shaft 12 remain stationary, the retainer 50 is supported such that the inner circumferential surface and the outer circumferential surface of the retainer 50 are respectively spaced from the rack shaft 12 and the nut 31 so as to avoid contact with the rack shaft 12 and the nut 31. In this case, due to the clearance between the retainer 50 and the balls 32, the clearance between the inner circumferential surface of the retainer 50 and the rack shaft 12, and the clearance between the outer circumferential surface of the retainer 50 and the nut 31, the retainer 50 may be inclined with respect to the nut 31 in such a manner that part of the axial ends of the retainer 50 approaches part of the axial ends of the nut 31 in the radial direction. In this regard, according to the embodiment, the nut 31 has a structure that allows a reduction in contact between the nut 31 and the retainer 50 when the retainer 50 is inclined with respect to the nut 31.

Figure 5:
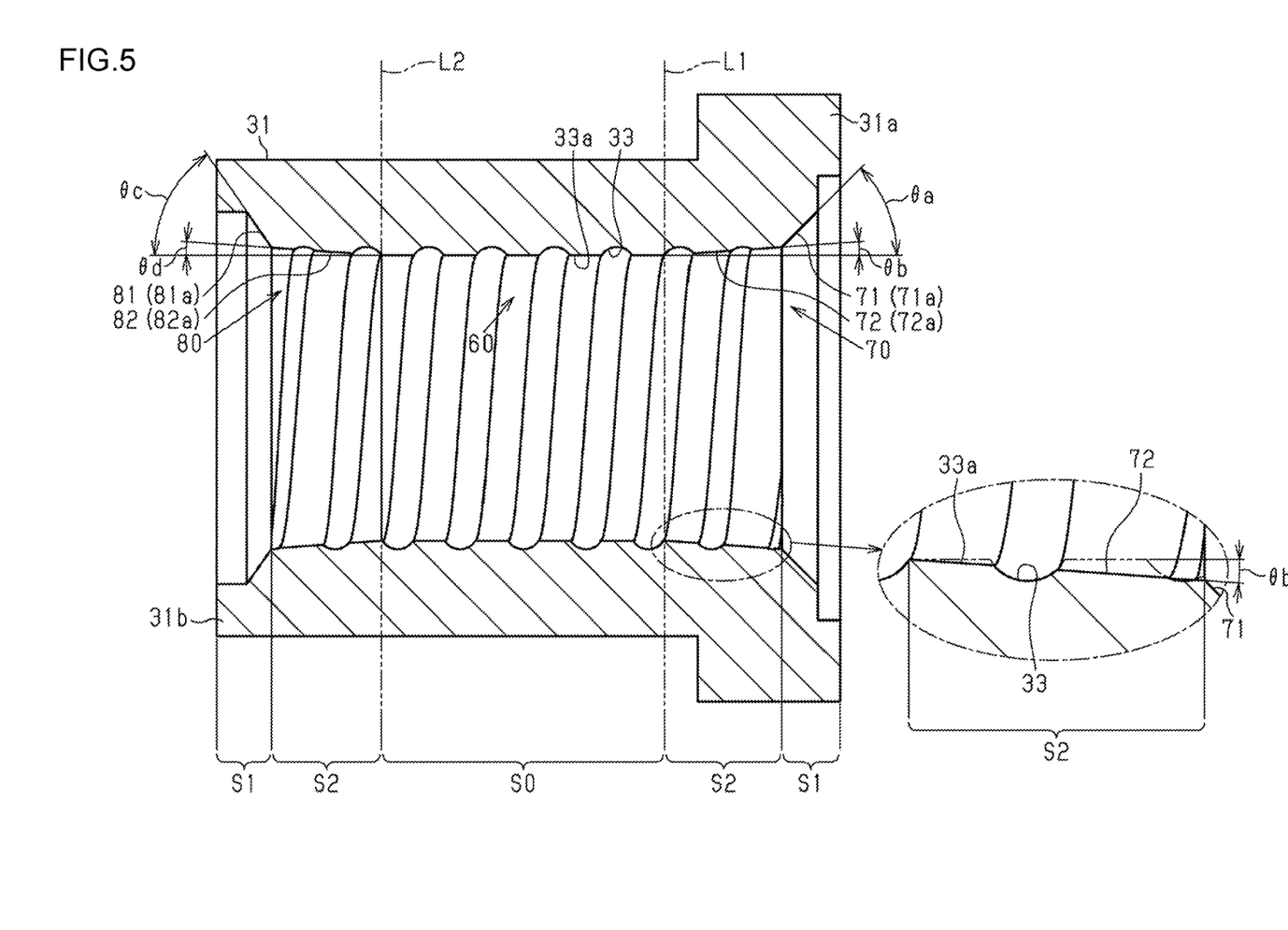
FIG. 5 is a cross-sectional view of the structure of a nut.

The description below details the structure of the nut 31 that allows a reduction in contact between the nut 31 and the retainer 50 when the retainer 50 is inclined with respect to the nut 31. As shown in FIG. 5, the nut 31 has a uniform diameter portion 60 and a pair of enlarged diameter portions 70 and 80. When viewed from the radial direction of the nut 31, the inside diameter of the uniform diameter portion 60 is uniform, and the inside diameters of the pair of enlarged diameter portions 70 and 80 are each larger than that of the uniform diameter portion 60. The pair of enlarged diameter portions 70 and 80 are provided at both axial sides of the uniform diameter portion 60. Specifically, the enlarged diameter portion 70 is provided at one side provided with the flanged end 31a of the nut 31 and includes the flanged end 31a, and the enlarged diameter portion 80 is provided at the other side provided with the shafted end 31b of the nut 31 and includes the shafted end 31b. It is noted that the inside diameter of the nut 31 is measured at the crest of a screw thread 33a on the inner circumferential surface of the nut 31. The inner circumferential surface of the enlarged diameter portion 70 includes a tapered portion that increases in inside diameter toward an end face of one of the opposite axial ends of the nut 31 that is closer to the enlarged diameter portion 70 than to the enlarged diameter portion 80. Likewise, the inner circumferential surface of the enlarged diameter portion 80 has a tapered portion that increases in inside diameter toward an end face of the other of the opposite axial ends of the nut 31 that is closer to the enlarged diameter portion 80 than to the enlarged diameter portion 70.

The enlarged diameter portion 70 includes a first enlarged diameter portion 71 adjoining to an end face of the flanged end 31a and a second enlarged diameter portion 72 adjoining to the first enlarged diameter portion 71. The first enlarged diameter portion 71 includes a tapered portion 71a that has a uniform diameter within a predetermined distance from the end face of the flanged end 31a and that is tapered, beyond the predetermined distance, to form an inclination angle $\theta a$, i.e., to form a tapered angle $2\theta a$ (double the inclination angle $\theta a$) with respect to the axial direction of the nut 31. The second enlarged diameter portion 72 includes a tapered portion 72a that is tapered to form an inclination angle $\theta b$, i.e., to form a tapered angle $2\theta b$ (double the inclination angle $\theta b$) with respect to the axial direction of the nut 31. The tapered angle $2\theta b$ (the inclination angle $\theta b$) of the tapered portion 72a of the second enlarged diameter portion 72 is smaller than the tapered angle $2\theta a$ (the inclination angle $\theta a$) of the tapered portion 71a of the first enlarged diameter portion 71. As such, the inner circumferential surface of the enlarged diameter portion 70 has two different inclination angles, i.e., two different tapered angles (one is defined by the first enlarged diameter portion 71, the other is defined by the second enlarged diameter portion 72) with respect to the axial direction of the nut 31, and the inside diameter of the enlarged diameter portion 70 changes at two different rates such that the inclination is larger on the flanged end 31a side.

The enlarged diameter portion 80 includes a first enlarged diameter portion 81 adjoining to an end face of the shafted end 31b and a second enlarged diameter portion 82 adjoining to the first enlarged diameter portion 81. The first enlarged diameter portion 81 includes a tapered portion 81a that has a uniform diameter within a predetermined distance from the end face of the shafted end 31b and that is tapered, beyond the predetermined distance, to form an inclination angle $\theta c$, i.e., to form a tapered angle $2\theta c$ (double the inclination angle $\theta c$) with respect to the axial direction of the nut 31. According to the embodiment, the inclination angle $\theta c$ is different in magnitude from the inclination angle $\theta a$. The second enlarged diameter portion 82 includes a tapered portion 82a that is tapered to form an inclination angle $\theta d$, i.e., to form a tapered angle $2\theta d$ (double the inclination angle $\theta d$) with respect to the axial direction of the nut 31. According to the embodiment, the inclination angle $\theta d$ is equal in magnitude to the inclination angle $\theta b$. The tapered angle $2\theta d$ (the inclination angle $\theta d$) of the tapered portion 82a of the second enlarged diameter portion 82 is smaller than the tapered angle $2\theta c$ (the inclination angle $\theta c$) of the tapered portion 81a of the first enlarged diameter portion 81. As such, the inner circumferential surface of the enlarged diameter portion 80 has two different inclination angles, i.e., two different tapered angles (one is defined by the first enlarged diameter portion 81, the other is defined by the second enlarged diameter portion 82) with respect to the axial direction of the nut 31, and the inside diameter of the enlarged diameter portion 80 changes at two different rates such that the inclination is larger on the shafted end 31b side.

The enlarged diameter portions 70 and 80 are respectively provided at the axial ends 31a and 31b in a region on the inner circumferential surface of the nut 31 that faces the retainer grooves 52 and retainer ends adjoining to opposite axial ends of the retainer grooves 52 when the retainer 50 is located between the outer circumferential surface of the rack shaft 12 and the inner circumferential surface of the nut 31.

Specifically, the first enlarged diameter portion 71 is provided in a region S1 on the inner circumferential surface of the nut 31 that has no screw thread 33a and that extends from the end face of one of the opposite axial ends of the nut 31 that is closer to the first enlarged diameter portion 71 than to the first enlarged diameter portion 81. Likewise, the first enlarged diameter portion 81 is provided in a region S1 on the inner circumferential surface of the nut 31 that has no screw thread 33a and that extends from the end face of the other of the opposite axial ends of the nut 31 that is closer to the first enlarged diameter portion 81 than to the first enlarged diameter portion 71. In particular, the first enlarged diameter portion 81 provided at the shafted end 31b of the nut 31 is provided in a region on the inner circumferential surface of the nut 31 that faces neither the retainer grooves 52 nor the retainer ends adjoining to the opposite axial ends of the retainer grooves 52 when the retainer 50 is located between the outer circumferential surface of the rack shaft 12 and the inner circumferential surface of the nut 31. In summary, the first enlarged diameter portion 81 is provided in a region on the inner circumferential surface of the nut 31 that does not face the retainer 50. The region that has no screw thread 33a of the nut 31 allows part of a cutting tool for machining the nut 31 to be inserted into the nut 31 to provide the screw groove 33. For example, the cutting tool has a rod shape and includes: a mounting portion attached to a main shaft of a machine tool; a cutting portion for cutting the screw groove 33; and a tapered portion that is located between the mounting portion and the cutting portion and that decreases in outside diameter in a direction from the mounting portion to the cutting portion.

The inclination angles $\theta a$ and $\theta c$ of the first enlarged diameter portions 71 and 81 (the tapered portions 71a and 81a) are set to magnitudes that allow the first enlarged diameter portions 71 and 81 to avoid contact with the cutting tool having the tapered portion when the cutting tool is inserted into the nut 31 from the axial ends of the nut 31. The magnitudes of the inclination angles $\theta a$ and $\theta c$ that allow the first enlarged diameter portions 71 and 81 to avoid contact with the cutting tool are empirically determined with consideration of factors including the tapered angle and shape of the tapered portion of the cutting tool. Since the embodiment is based on the assumption that different cutting tools are inserted into the nut 31 from the axial ends of the nut 31, the first enlarged diameter portions 71 and 81 (the tapered portions 71a and 81a) have different inclination angles $\theta a$ and $\theta c$ and different shapes.

Each of the second enlarged diameter portions 72 and 82 is provided in a region on the inner circumferential surface of the nut 31 that has the screw thread 33a of the nut 31 and where no ball 32 is located when the nut 31 is threadedly engaged with the screw groove 12a of the rack shaft 12 through the balls 32.

For example, as illustrated in FIG. 3 and FIG. 5, when boundary lines L1 and L2 are defined as lines extending perpendicular to the axial direction of the nut 31 and passing different axial ends of a region on the inner circumferential surface of the nut 31 where the balls 32 are located, the second enlarged diameter portion 72 is provided in a region S2 on the inner circumferential surface of the nut 31 that extend, to the first enlarged diameter portion 71, from the boundary line L1 toward the end face of one of the axial ends of the nut 31 that is closer to the boundary line L1 than to the boundary line L2. Likewise, the second enlarged diameter portion 82 is provided in a region S2 on the inner circumferential surface of the nut 31 that extend, to the first enlarged diameter portion 81, from the boundary line L2 toward the end face of the other of the axial ends of the nut 31 that is closer to the boundary line L2 than to the boundary line L1. The uniform diameter portion 60 is provided in a region S0 on the inner circumferential surface of the nut 31 that has the screw thread 33a of the nut 31 and where the balls 32 are located when the nut 31 is threadedly engaged with the screw groove 12a of the rack shaft 12 through the balls 32.

As indicated by a long dashed double-short dashed line in an enlarged view in FIG. 5, the height of the crest of turns (two turns in the embodiment) of the screw thread 33a of the nut 31 in the second enlarged diameter portions 72 and 82 is set smaller than that when the uniform diameter portion 60 is elongated over the entire axial length of the nut 31. In the second enlarged diameter portions 72 and 82, the crest of the screw thread 33a formed by cutting the screw groove 33 in the nut 31 is further cut down radially outward.

Further, the inclination angles θb and θd of the second enlarged diameter portions 72 and 82 (the tapered portions 72a and 82a) are set to magnitudes that allow the second enlarged diameter portions 72 and 82 to avoid contact with the retainer 50 when the retainer 50 is inclined with respect to the nut 31 such that part of the axial ends of the retainer 50 approaches part of the axial ends of the nut 31. The magnitudes of the inclination angles θb and θd that allow the second enlarged diameter portions 72 and 82 to avoid contact with the retainer 50 are determined by adding some margin to magnitudes that are geometrically determined from the axial length of the retainer 50, the clearance between the retainer 50 and the balls 32, the clearance between the inner circumferential surface of the retainer 50 and the rack shaft 12, and the clearance between the outer circumferential surface of the retainer 50 and the nut 31.

The embodiment described above has the following effects (1) to (5). (1) As illustrated in FIG. 2 and FIG. 3, when the retainer 50 is not inclined with respect to the nut 31, there is some clearance between the outer circumferential surface of the retainer 50 and the nut 31. In contrast, when the retainer 50 is inclined with respect to the nut 31, part of the axial ends of the retainer 50 approach part of the axial ends of the nut 31 in a space between the retainer 50 and the nut 31.

Figure 6A:
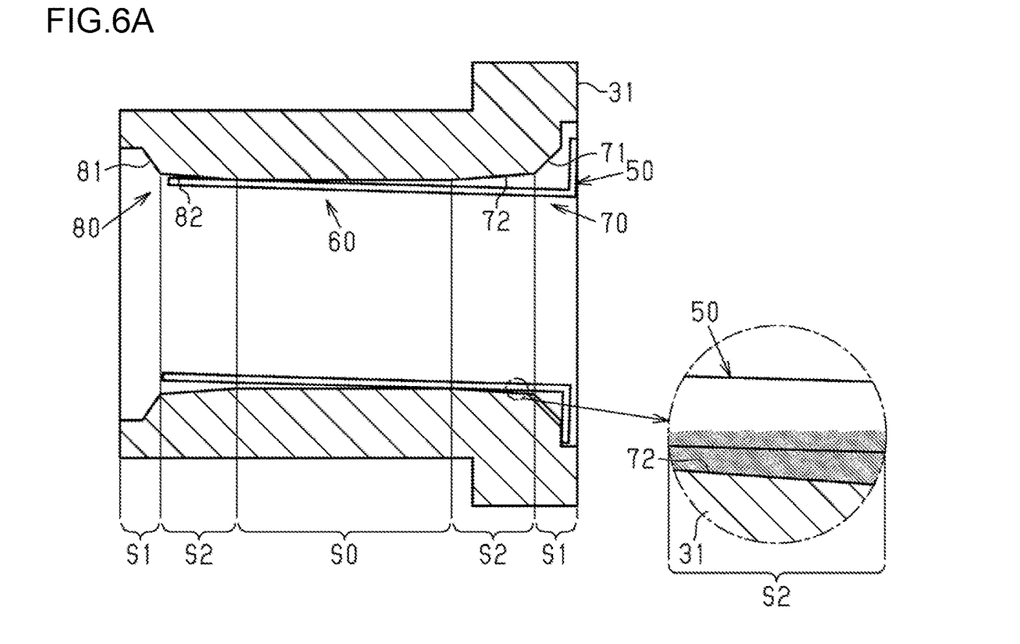
FIG. 6A is a diagram schematically illustrating a situation where the retainer is inclined with respect to the nut.
Figure 6B:
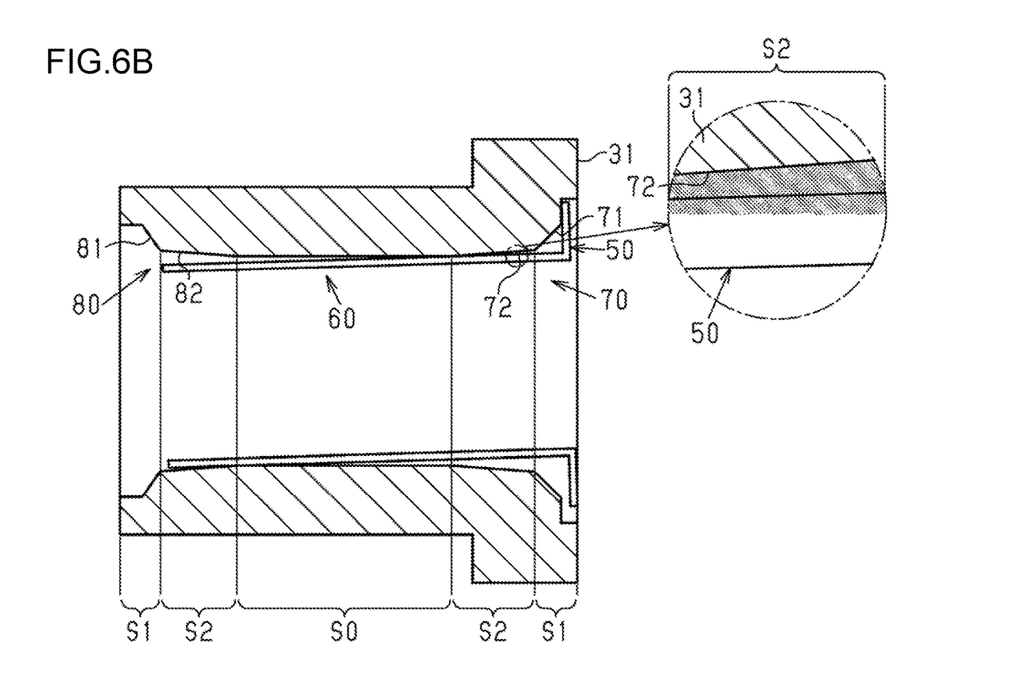
FIG. 6B is a diagram schematically illustrating a situation where the retainer is inclined with respect to the nut.

For example, when the retainer 50 is inclined with respect to the nut 31 as illustrated in FIGS. 6A and 6B, in the second enlarged diameter portions 72 and 82 of the nut 31, the outer circumferential surface in the vicinity of the axial ends of the retainer 50 may enter regions (hatched regions in FIGS. 6A and 6B) that have the tapered angles 2θb and 2θd with respect to the uniform diameter portion 60 and that have the screw thread 33a whose crest is cut down. It is noted that for convenience in description, the nut 31 and the retainer 50 in FIGS. 6A and 6B are illustrated in a simplified manner. In this case, in the regions that have the tapered angles 2θb and 2θd with respect to the uniform diameter portion 60 and that have the screw thread 33a whose crest is cut down, contact between the axial ends of the retainer 50 and the axial ends of the nut 31 is avoidable.

In summary, according to the embodiment, even when the axial ends of the retainer 50 approach the axial ends of the nut 31, contact between the axial ends of the retainer 50 and the enlarged diameter portions 70 and 80 of the nut 31, i.e., the second enlarged diameter portions 72 and 82 of the nut 31 is reduced. The same is true for the first enlarged diameter portions 71 and 81 that are provided to avoid contact with the cutting tool used to provide the screw groove 33 on the inner circumferential surface of the nut 31. This allows a reduction in contact between the nut 31 and the cutting tool used to provide the screw groove 33 on the inner circumferential surface of the nut 31 while allowing a reduction in contact and friction between the retainer 50 and the nut 31, thus making it possible to reduce a friction torque of the nut 31.

When the friction between the retainer 50 and the nut 31 is reduced, wear of the retainer 50 made of resin that is worn more easily than the nut 31 made of an iron alloy is reduced accordingly. Thus, the durability of the retainer 50 is improved, and accordingly, the durability of the ball screw mechanism 30 is improved.

(2) The first enlarged diameter portions 71 and 81 respectively have the tapered portions 71a and 81a that increase in inside diameter toward the end faces of their respective closer axial ends of the nut 31, and the second enlarged diameter portions 72 and 82 respectively have the tapered portions 72a and 82a that increase in inside diameter toward the end faces of their respective closer axial ends of the nut 31. This structure allows a reduction in contact between the axial ends of the retainer 50 and the axial ends of the nut 31 in the second enlarged diameter portions 72 and 82 of the nut 31 when the retainer 50 is inclined with respect to the nut 31 as illustrated in FIGS. 6A and 6B, for example, regardless of whether the axial ends of the retainer 50 are elongated or shortened. In summary, the embodiment makes it possible to relax the limitations of the specifications of the retainer 50, including the length, that are required to reduce contact between the nut 31 and the cutting tool used to provide the screw groove 33 on the inner circumferential surface of the nut 31 and that are required to reduce contact between the retainer 50 and the nut 31.

(3) As illustrated in FIG. 5, the height of the screw thread 33a in the second enlarged diameter portions 72 and 82 in the radial direction of the nut 31 is smaller than that of the screw thread 33a in the uniform diameter portion 60. When an axial force is applied to the rack shaft 12 in accordance with rotation of the nut 31, the area of the screw thread 33a of the screw groove 33 in the nut 31 to receive stress against load applied to the balls 32 is reduced accordingly. As a result, stress acting on the screw thread 33a in the second enlarged diameter portions 72 and 82 increases.

In this regard, according to the embodiment, since the tapered angles 2θb and 2θd are smaller than the tapered angles 2θa and 2θc, the height of the screw thread 33a in the second enlarged diameter portions 72 and 82 in the radial direction of the nut 31 changes at a rate smaller than that when the first enlarged diameter portions 71 and 81 are elongated in the axial direction. This reduces variation in stress acting on the screw thread 33a in the second enlarged diameter portions 72 and 82 due to load applied to the balls 32, thus reducing the portion with the likelihood of excessive stress being applied to the screw thread 33a. Therefore, it is possible to reduce contact between the retainer 50 and the nut 31 without sacrificing the durability of the nut 31, i.e., without sacrificing the durability of the ball screw mechanism 30.

According to the embodiment, the second enlarged diameter portions 72 and 82 are provided in the region S2 where no ball 32 is located. However, the second enlarged diameter portions 72 and 82 may abut against the balls 32 at the screw thread 33a adjacent to the boundary lines L1 and L2 (i.e., at the screw thread 33a located on the near side of the cross-section in FIG. 5) on the boundary lines L1 and L2 sides. In such a case, although the screw thread 33a is lower in the second enlarged diameter portions 72 and 82 than in the uniform diameter portion 60, the screw thread 33a in the second enlarged diameter portions 72 and 82 reduces an increase in stress due to load applied to the balls 32.

(4) One of the axial ends of the retainer 50 is provided with the enlarged diameter portion 70, i.e., the second enlarged diameter portion 72, and the other of the axial ends of the retainer 50 is provided with the enlarged diameter portion 80, i.e., the second enlarged diameter portion 82. Thus, even when part of the axial ends of the retainer 50 approaches part of the axial ends of the nut 31, contact between the axial ends of the retainer 50 and the axial ends of the nut 31 is reduced. This reduces contact and friction between the retainer 50 and the nut 31 more effectively, thus reducing friction between the retainer 50 and the nut 31 more effectively.

(5) The EPS 1 having the ball screw mechanism 30 according to the embodiment reduces contact between the retainer 50 and the nut 31, thus reducing the influence of such contact on steering feel. Further, when the contact between the retainer 50 and the nut 31 is reduced, noise caused from the contact is reduced accordingly, so that quietness of the EPS 1 is improved.

The embodiment described above can be modified in various ways. Some examples of modifications are described below. The nut 31 may have only one of the enlarged diameter portions 70 and 80. For example, the nut 31 may have no enlarged diameter portion 70 at the flanged end 31a.

The magnitudes of the inclination angles, i.e., the tapered angles of the first enlarged diameter portions 71 and 81 and the second enlarged diameter portions 72 and 82 can be changed as needed. For example, for the tapered angles, the relationship between the tapered angle 2θa and the tapered angle 2θb, the relationship between the tapered angle 2θa and the tapered angle 2θc, the relationship between the tapered angle 2θb and the tapered angle 2θd, and the relationship between the tapered angle 2θc and the tapered angle 2θd may be changed.

The second enlarged diameter portions 72 and 82 of the nut 31 can be provided in regions other than the region S2. For example, besides the first enlarged diameter portions 71 and 81, the second enlarged diameter portions 72 and 82 may be provided in regions that has no screw thread 33a of the nut 31. Further, the second enlarged diameter portions 72 and 82 may be provided in regions where the balls 32 are located. Moreover, the second enlarged diameter portions 72 and 82 may extend from positions away from the boundary lines L1 and L2 illustrated in FIG. 5, toward the end faces of their respective closer ends of the nut 31. When the second enlarged diameter portions 72 and 82 are provided in regions where the balls 32 are located, the above effect (3) of the embodiment is achieved more effectively.

Besides the second enlarged diameter portions 72 and 82, the first enlarged diameter portions 71 and 81 may include regions that have the screw thread 33a of the nut 31. Any one of the enlarged diameter portions 70 and 80 may have no second enlarged diameter portion. At least one of the enlarged diameter portions 70 and 80 may have none of the first enlarged diameter portions 71 and 81.

The enlarged diameter portions 70 and 80 may have the same shape. The enlarged diameter portions 70 and 80 may have more than two tapered angles. The enlarged diameter portions 70 and 80 may have no tapered portion as long as the inside diameters of the enlarged diameter portions 70 and 80 are larger than the inside diameter of the uniform diameter portion 60. For example, each of the enlarged diameter portions 70 and 80 may have a uniform diameter portion with a uniform inside diameter in their middle part or may have multiple uniform diameter portions with different inside diameters that are combined to change their inside diameter stepwise.

The first enlarged diameter portions 71 and 81 of the enlarged diameter portions 70 and 80 are not essential elements, and the enlarged diameter portions 70 and 80 may have only the second enlarged diameter portions 72 and 82, respectively. In this case, the first enlarged diameter portions 71 and 81 are structured to have a uniform diameter. This structure reduces contact between the axial ends of the retainer 50 and the axial ends of the nut 31 provided with the second enlarged diameter portions 72 and 82, thus reducing contact and friction between the retainer 50 and the nut 31.

The specifications of the retainer 50, including the length, can be modified as needed. For example, the retainer 50 may have such a length that the end of the retainer 50, opposite to the rib portion 51, reaches the first enlarged diameter portion 81 of the nut 31. This structure achieves effects similar to those of the embodiment. The retainer 50 may have no rib portion 51. In this case, restricting the axial movement of the retainer 50 by adding a stopper ring to the inner periphery of the nut 31 can achieve effects similar to those of the embodiment. The retainer 50 may be made of metal or composite materials.

The nut 31 may be supported directly by the bearing 44. In this case, not only the bearing 44 but also the driven pulley 42 are fixed to the outer circumferential surface of the nut 31. This structure achieves effects similar to those of the embodiment.

Besides a steering system, the ball screw mechanism 30 can be used for any other system that has a mechanism for converting rotary motion into linear motion. For example, the ball screw mechanism 30 may be used for machine tools and microscopes.

The embodiment embodies a steering system as the EPS 1, but a steering system is not limited to an EPS. For example, a steering system may be embodied as a steer-by-wire steering system. Instead of a steer-by-wire (SBW) steering system, a steering system may be embodied as a rear wheel steering system or a four-wheel steering (4WS) system. When a steering system is embodied as a steer-by-wire steering system, a shaft having no rack can be employed as a steered shaft instead of the rack shaft 12 having a rack. In this case, for example, the ball screw mechanism 30 is used to apply a steered force to the shaft as a steered shaft.

What is claimed is:
1. A ball screw mechanism comprising:
a screw shaft having an outer circumferential surface provided with a helical screw groove;

a cylindrical nut having an inner circumferential surface provided with a uniform diameter portion, a first enlarged diameter portion adjoining a first axial end of the uniform diameter portion, a second enlarged diameter portion adjoining a second axial end of the uniform diameter portion, and a helical screw groove formed in the uniform diameter portion and corresponding to the helical screw groove of the screw shaft;

a plurality of balls; and a cylindrical retainer provided between the screw shaft and the nut, wherein:

the retainer has a retainer groove that retains the plurality of balls to allow the plurality of balls to avoid contact with each other, the nut is threadedly engaged with the screw groove of the screw shaft through the plurality of balls, an axial force is applied to the screw shaft in accordance with rotation of the nut, the nut being configured to rotate about an axis, an inside diameter of the uniform diameter portion, excluding the helical screw groove formed therein, has a uniform diameter, an inside diameter of each of the first and second enlarged diameter portions is larger than the inside diameter of the uniform diameter portion, the uniform diameter portion and the first enlarged diameter portion face the retainer, the first enlarged diameter portion includes a first tapered portion having a first inclination angle and a second tapered portion having a second inclination angle, the first inclination angle being different from the second inclination angle, the second enlarged diameter portion includes a third tapered portion having a third inclination angle and a fourth tapered portion having a fourth inclination angle, the third inclination angle being different from the fourth inclination angle, and the first inclination angle of the first tapered portion and the third inclination angle of the third tapered portion are tapered at an angle to allow the retainer to be inclined with respect to the axis of the nut and to reduce contact and friction between the retainer and the nut.

2. The ball screw mechanism according to claim 1, wherein the second inclination angle of the second tapered portion and the fourth inclination angle of the fourth tapered portion are configured to avoid contact with a tool for providing the screw groove on the inner circumferential surface of the nut.

3. The ball screw mechanism according to claim 2, wherein the first tapered portion adjoins the first axial end of the uniform diameter portion and includes a screw thread projecting between adjacent turns of the screw groove on the inner circumferential surface of the nut, the second tapered portion adjoins the first tapered portion and a first end face at a first axial end of the nut, the third tapered portion adjoins the second axial end of the uniform diameter portion and includes a screw thread projecting between adjacent turns of the screw groove on the inner circumferential surface of the nut, the fourth tapered portion adjoins the third tapered portion and a second end face at a second axial end of the nut, the inside diameter of each of the first and third tapered portions is measured at a crest of the screw thread of the nut and increases toward the first and second end faces, respectively, the inclination angle of the first tapered portion is smaller than the inclination angle of the second tapered portion, and the inclination angle of the third tapered portion is smaller than the inclination angle of the fourth tapered portion.

4. A steering system comprising:

the ball screw mechanism of claim 1; and a motor for supplying the nut with a force that rotates the nut, wherein the screw shaft is a steered shaft that performs reciprocating axial motion and that has opposite ends, each end connected to a corresponding one of steered wheels that are steered in accordance with the reciprocating axial motion, and the ball screw mechanism steers the steered wheels by converting rotary motion of the motor into the reciprocating axial motion of the steered shaft.

5. The ball screw mechanism according to claim 1, wherein the retainer is configured such that axial ends of the retainer, when inclined, do not contact an axial end of the nut in the first and second enlarged diameter portions.

6. The ball screw mechanism according to claim 1, wherein the first enlarged diameter portion includes a first portion having an inside diameter that increases toward an end face of one of opposite axial ends of the nut, the first portion located closer to the one of the opposite axial ends of the nut than to the other one of the opposite axial ends of the nut.

7. The ball screw mechanism according to claim 6, wherein the first and second enlarged diameter portions are configured to avoid contact with a tool for providing the screw groove on the inner circumferential surface of the nut and to avoid contact with the retainer.

8. The ball screw mechanism according to claim 7, wherein the first enlarged diameter portion adjoins to the end face of the one of the opposite axial ends of the nut, the second enlarged diameter portion includes a screw thread projecting between adjacent turns of the screw groove on the inner circumferential surface of the nut, the inside diameter of one of the tapered portions of the second enlarged diameter portion is measured at a crest of the screw thread of the nut and increases toward the end face of the closer one of the opposite axial ends of the nut, and a tapered angle of the first tapered portion of the first enlarged diameter portion is smaller than a tapered angle of the second tapered portion of the first enlarged diameter portion.

9. A ball screw mechanism comprising:

a screw shaft having an outer circumferential surface provided with a helical screw groove;

a cylindrical nut having an inner circumferential surface provided with a uniform diameter portion, an enlarged diameter portion adjoining the uniform diameter portion, and a helical screw groove formed in the uniform diameter portion and corresponding to the helical screw groove of the screw shaft;

a plurality of balls; and a cylindrical retainer provided between the screw shaft and the nut, wherein:

the retainer has a retainer groove that retains the plurality of balls to allow the plurality of balls to avoid contact with each other, the nut is threadedly engaged with the screw groove of the screw shaft through the plurality of balls, an axial force is applied to the screw shaft in accordance with rotation of the nut, the nut being configured to rotate about an axis, an inside diameter of the uniform diameter portion, excluding the helical screw groove formed therein, has a uniform diameter, an inside diameter of the enlarged diameter portion is larger than the inside diameter of the uniform diameter portion, the enlarged diameter portion is provided at opposite axial ends on the inner circumferential surface of the nut, the uniform diameter portion and the enlarged diameter portion face the retainer, and the enlarged diameter portion is tapered only at axial positions where there are no balls, wherein the retainer comprises a rib portion that does not project beyond a flanged end of the nut in the axial direction, and the rib portion is located between the flanged end of the nut and a locking screw to restrict movement of the retainer.

* * * * *